United States Patent Office 3,028,354
Patented Apr. 3, 1962

3,028,354
PROCESS FOR MIXING POLYETHYLENE, CARBON BLACK AND AN ORGANIC PEROXIDE
Albert P. Messier, Lynn, Mass., assignor to Cabot Corporation, Boston, Mass., a corporation of Delaware
No Drawing. Filed July 18, 1957, Ser. No. 672,546
2 Claims. (Cl. 260—41)

This invention relates to plastic compositions, and particularly to a method of mixing together polymers with cross-linking agents subject to decomposition at the normal milling temperatures of the polymers.

It has been found that the physical properties of polymers composed of essentially saturated long chain high molecular weight compounds of carbon and hydrogen, notably formed by the polymerization of olefins such as ethylene, can be greatly improved by the addition thereto of a free radical producing agent such as an organic peroxide which, on subsequent heat treatment, decomposes to effect cross-linking between the polymer chains. Such cross-linked compounds have greatly increased yield strength, creep resistance, and stress cracking properties, particularly when a filler such as carbon black is also included.

Heretofore, efforts to compound such materials into a form suitable for commercial use in plastics fabricating machinery have met with considerable difficulty. For effective compounding the cross-linking agent must be thoroughly milled into the polymer, but the milling must be accomplished at temperatures below which any substantial cross-linking will take place since once cross-linking has occurred, the material is thereafter substantially unworkable. Yet for satisfactory mixing the polymer must first be fluxed, that is, transformed into a semi-molten state, and maintained in this condition while the filler and cross-linking agent are added. But the fluxing temperatures of most of the polymers in the class above mentioned are in excess of 230° F., at which temperature all of the presently known practicable cross-linking agents decompose rapidly enough to effect cross linking through the generation of free radicals. Hence a substantial amount of cross-linking must occur during milling when previously practiced techniques are employed, which renders the material unfit for further use.

The principal object of this invention is to provide a method of milling polymeric compositions with cross-linking agents without substantial occurrence of cross-linking thereof during milling.

A further object of the invention is to provide a plastic polymeric material which is capable of being strengthened by heat treatment.

A further object of the invention is to provide a method of milling such a composition in which heat generated by internal friction of the material during milling is utilized to effect the fluxing of the polymer.

Other objects of the invention will be apparent to one skilled in the art from the following description of a specific embodiment thereof.

In accordance with this invention it has been found that a polymer such as polyethylene, which is capable of being strengthened by compounding with a cross-linking agent, followed by heat treatment to decompose the cross-linking agent and effect cross linking by the generation of free radicals, can be milled with the filler and the cross-linking agent without any substantial amount of cross-linking occurring during the milling process, by carrying out the milling operation in a manner such that the components of the material are thoroughly milled which gradually raising the temperature of the mixture to the fluxing temperature of the polymer.

Specifically, it has been found that if all the constituents of the mixture are thoroughly milled in a chamber having heated walls maintained at a temperature below the fluxing temperature of the polymer, and such milling is done at a rate sufficient to cause the mixture to increase in temperature by internal friction to about the fluxing temperature of the polymer, a thorough dispersion of the materials is obtained without substantial decomposition of the cross-linking agent, and the milled material is suitable for use as feed material for conventional plastic fabricating machinery.

*Example I*

A Banbury mixer, having walls heated by a water-steam jacket to about 170° F., was charged with a mixture consisting of polyethylene chips (Alathon 10), carbon black in an amout equal to the weight of the polyethylene, and dicumyl peroxide in an amount equal to 2.5% by weight of the polyethylene. Milling was commenced, with the rotor operating at a speed of 120 r.p.m. No heating water was applied to the rotor. The temperature of the batch, as measured by a thermocouple, increased gradually to 210° F., after milling for about 2 minutes. The rotor speed was then reduced to 78 r.p.m., and milling continued for another minute. The batch temperature remained at 210° F., The batch was then removed from the Banbury, and immediately transferred to a two roll mill, in which the roll surface temperature was 220° F., and formed into a sheet as rapidly as possible. The sheet was then cooled, formed into test blanks about 1/16 inch in thickness. The material was found to be substantially completely soluble in xylene, and melted readily on a hot plate at 400° F. showing that substantially no cross-linking had occurred.

The test blanks were then heated for 20 minutes at a temperature of 340° F. to effect cross-linking. The resulting sheet was tough, flexible, and strong, and had a yield strength of 3500 p.s.i. It was less than 20% soluble in xylene, and did not melt on a hot plate at 400° F.

Although in the above example of a specific embodiment of the invention, the mixing process was accomplished in a Banbury mixer, other types of mixers may be used, provided they are capable of mixing the material rapidly enough to cause the temperature of the batch to increase, by internal friction, to a point high enough to effect complete dispersion of the components. The wall temperature of the mixing chamber is not critical, as long as it is enough below the fluxing temperature of the polymer that decomposition of the cross-linking agent does not occur, and as long as it is high enough that the milling operation is able to supply the rest of the heat necessary to raise the batch to the desired temperature.

In some cases, for example, when 50 to 200% by weight based on the weight of the polymer of filler is utilized, it may be convenient to mill the filler and the polymer together, add the cross-linking agent, and thereafter raise the temperature of the material high enough to flux the polymer by vigorous milling.

Since the decomposition of the peroxides used in such processes is a function of both temperature and the time of exposure to the temperature, an important feature of the present invention is the fact that a large part of the milling occurs below the fluxing temperature of the polymer with the temperature gradually rising during the milling operation. Hence when the temperature of the batch reaches the fluxing temperature of the polymer, the materials are already intimately mixed, hence only a short milling time at the fluxing temperature is required.

Another important feature of the invention is the fact that the heat which accomplishes the fluxing of the polymer is generated within the batch by internal friction. In previous milling processes, the heat for fluxing is applied from the mixing chamber walls and from heated mixing rotors. In order to transfer sufficient heat into the batch to insure fluxing of all portions thereof, the chamber walls must be maintained at a temperature in excess of the minimum fluxing temperature. Hence portions of the batch are necessarily exposed to a temperature higher than the minimum required for fluxing, and since such exposure continues throughout the entire milling cycle an appreciable amount of cross-linking resulted.

In contrast, in the process disclosed herein, the material is exposed to the necessary fluxing temperature for only a very short time, since most of the milling is accomplished below the fluxing temperature, and the maximum temperature to which any portion of the material is exposed is the absolute minimum required for fluxing, by reason of the fact that the heat for fluxing is generated within the material itself.

Although the above described process is particularly adapted for the incorporation into polyethylene of a cross-linking agent which is subject to decomposition at the normal milling temperature of the polymer, it may also be used in any analogous process in which a heat-decomposable material is to be milled into a plastic material.

Since certain obvious modifications may be made in the process without departing from the scope of the invention, it is intended that all matter contained herein be interpreted in an illustrative and not in a limiting sense.

I claim:

1. A process for producing a highly filled, uncross-linked polyethylene composition capable of being subsequently transformed by heating into a well crosslinked material of greatly improved strength and physical properties which comprises subjecting polyethylene, 50 to 200% by weight based on said polyethylene of carbon black, and an organic peroxide crosslinking agent subject to substantial decomposition at the minimum fusion temperature of said polyethylene, to a shearing milling action at a rate sufficient to cause the temperature of same to increase to said minimum fusion temperature, and immediately stopping the milling operation at this point.

2. A process for producing a highly filled uncross-linked polyethylene composition capable of being subsequently transformed by heating into a well crosslinked material of greatly improved strength and physical properties which comprises subjecting polyethylene, 50 to 200% by weight based on said polyethylene of carbon black, and dicumyl peroxide to a shearing milling action at a rate sufficient to cause the temperature of same to increase to said minimum fusion temperature, and immediately stopping the milling operation at this point.

References Cited in the file of this patent

UNITED STATES PATENTS

| | | |
|---|---|---|
| 2,528,523 | Kent | Nov. 7, 1950 |
| 2,888,424 | Precopio et al. | May 26, 1959 |

FOREIGN PATENTS

| | | |
|---|---|---|
| 591,058 | Great Britain | Aug. 6, 1947 |
| 597,833 | Great Britain | Feb. 4, 1948 |
| 619,905 | Great Britain | Mar. 16, 1949 |